United States Patent [19]
Zhang

[11] Patent Number: 5,408,281
[45] Date of Patent: Apr. 18, 1995

[54] MULTIFOCAL CONTACT LENS
[75] Inventor: Xiaoxiao Zhang, Suwanee, Ga.
[73] Assignee: Ciba-Geigy, Ardsley, N.Y.
[21] Appl. No.: 53,122
[22] Filed: Apr. 26, 1993
[51] Int. Cl.$^6$ .......................... G02C 7/04; G02B 5/18; A61F 2/14; A61F 2/16
[52] U.S. Cl. ..................................... 351/161; 359/569; 359/573; 359/652; 359/654; 623/5; 623/6
[58] Field of Search ................ 351/160 R, 160 H, 161, 351/162; 359/569, 573, 652, 654; 623/6, 5

[56] References Cited

U.S. PATENT DOCUMENTS

| | | | |
|---|---|---|---|
| 4,889,421 | 12/1989 | Cohen | 351/162 |
| 5,009,497 | 4/1991 | Cohen | 351/161 |
| 5,071,207 | 12/1991 | Ceglio | 359/15 |
| 5,120,120 | 6/1992 | Cohen | 351/161 |

FOREIGN PATENT DOCUMENTS

| | | |
|---|---|---|
| 107444 | 5/1984 | European Pat. Off. . |
| 109753 | 5/1984 | European Pat. Off. . |
| 158999 | 10/1985 | European Pat. Off. . |
| 522852 | 1/1993 | European Pat. Off. . |
| 2252843 | 8/1992 | United Kingdom . |
| 88/09950 | 12/1988 | WIPO . |

Primary Examiner—Scott J. Sugarman

[57] ABSTRACT

A multifocal ophthalmic lens has a spiral-like pattern on its surface in an area overlying the cornea of a wearer of the lens. The spiral-like pattern is capable of providing a plurality of different dioptric powers.

14 Claims, 2 Drawing Sheets

MULTIFOCAL CONTACT LENS

BACKGROUND OF THE INVENTION

The present invention relates to an improvement in ophthalmic lens design and more specifically relates to such a lens which provides bifocal vision.

Presbyopia is a vision defect associated with advancing age. The presbyopic patient lacks visual accomodation, i.e. the ability of the eye to adjust to clearly see objects that are close to or at intermediate distances from the eye without the aid of a corrective lens.

The common correction for presbyopia is to use bifocal eyeglasses which have an upper portion ground for distance viewing, having, most commonly, a correction for myopia or hyperopia, and a lower portion with diopters added for near viewing. However, this solution does not readily lend itself to contact lenses, which tend to move with the eyeball and disrupt vision. To overcome this problem, bifocal contact lenses have been used which have a thick lower edge which is engaged by the lower eyelid when the wearer looks down, causing the contact lens to slide upwards on the cornea relative to the pupil. Such lenses which move relative to the eye are hard to fit because the lens must be sized properly to be engaged by the lower lid. Also, the amount of movement of the lens must be accurately measured to determine the desired height of the bifocal segment.

There have been a number attempts at providing bifocal lenses which avoid the problems of the above-described, thick edged lens. One group of attempts provides a multifocal diffractive lens constructed by means of a series of concentric, phase manipulating annular rings. The rings provide simultaneous focal powers for near and distant vision having sharp transitions. A second group of attempts relates to a multifocal ophthalmic lenses having a plurality of concentric rings with a continuously varying power within each zone as well as in transition from one zone to another. The zones are accomplished either by continuously changing curvature of the posterior surface of the lens, or by creating non-homogeneous surface. characteristics having refractive material indices which continuously vary in the lens radial direction.

A problem exists, however, in that the concentric ring configurations described above are closed and form sealed regions around the cornea. The central portion of the human cornea is a very important optical component to vision. Proper tear flow at the central portion is critical to corneal health. Contact lenses, especially those which are hydrophilic, conform to the cornea when worn. The closed concentric rings on the lens back profile isolates tear film in the central cornea into closed ring shaped channels. Consequently, the tears will only circulate in a small, local area and the cornea is not easily refreshed. Also, an increase in debris trapped under the lens, as well as in corneal indentation patterns, is likely to occur.

Therefore, there exists a need for a multifocal lens which eliminates the problems inherent in using concentric rings, and more particularly, which provides for proper tear flow to all parts of the central cornea.

SUMMARY OF THE INVENTION

The present invention provides a multifocal, such as a bifocal, ophthalmic lens which contains, on at least one of its surfaces, a spiral-like pattern consisting of a single band capable of providing a plurality of different dioptric powers. Different dioptric powers may be created by choosing a cross-sectional band profile capable of selectively alternating the angle of impact of light rays on the eye. For example, the band may provide a continuous and progressive range of powers, or may provide a discrete set of individual powers. Alternatively, the spiral pattern may be printed onto the lens surface to achieve a refractive index change profile. In any case, however, the spiral pattern assures that there is a proper flow of tears throughout the area of the central cornea.

It is an object of the present invention, therefore, to provide a bifocal ophthalmic lens which relies on optical phase manipulation for achieving power, but without the physiological disadvantages inherent with closed concentric circles.

DETAILED DESCRIPTION OF THE PREFERRED EMBODIMENT

Figure 1:
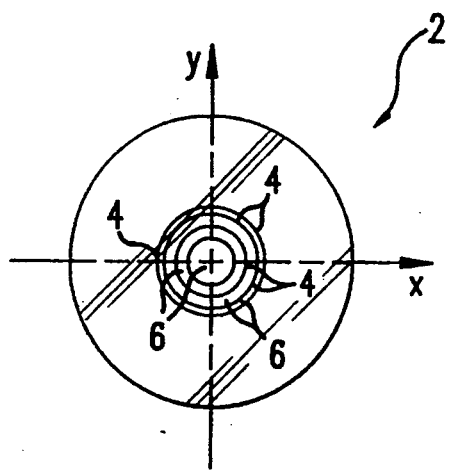
FIG. 1 is an elevational view of a prior art, closed concentric circle ophthalmic lens.

FIG. 1 illustrates a prior art ophthalmic lens 2 having a plurality of closed concentric rings 4 and local areas 6, as described above.

Figure 2:
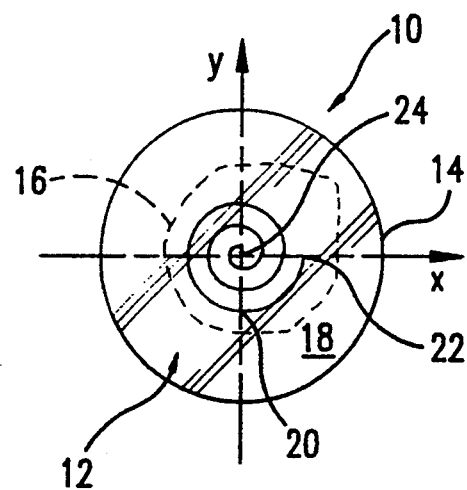
FIG. 2 is a front view of an ophthalmic lens according to the present invention.

The lens of the present invention may be adapted to be located on the surface of the eye, or may be permanently retained within the eye. FIG. 2 illustrates a multifocal contact lens 10 according to the present invention. The dimensions of the figures are not intended to be to scale. The lens 10 has a spherical, convex anterior surface 12 and a concave posterior surface 14. An aspherical optical area 16 is provided in the middle region of the lens 10, with an annular fitting portion 18 therearound.

The lens 10 has, on at least one of its surfaces 12, 14, a spiral-like pattern consisting of a single band 20 capable of providing a plurality of different dioptric powers. In the example shown in FIG. 2, the band 20 is provided on the posterior surface 14. The band 20 begins at a first end 22 near the periphery of the lens 10 and spirals inwardly, as a single line, towards the center portion of the lens 10, wherein the band 20 terminates at a second end 24.

As an example, a multifocal contact lens 10 may include a spiral band 20 pattern which conforms to the following equation:

$$T(x,y) = STEP(S)$$

wherein STEP(S) is a step function defined as 1 when $S \geq 0$ and 0 when $S < 0$ and wherein T=1 means light transmission is 100%, T=0 means light transmission is 0%;

and wherein S is calculated by the equation $$S(x,y) = \sin[\pi \cdot P/2\beta \cdot (x^2+y^2) + k \cdot A \tan(x/y) + \beta]$$

wherein P is the add power (power difference between two extreme foci) desired, $\lambda$ is the wavelength of interest, k is a spiral shape control parameter, x and y are the Cartesian coordinates on the lens with the origin located at the center of the lens, and $\beta$ is starting phase control parameter.

Figure 3:
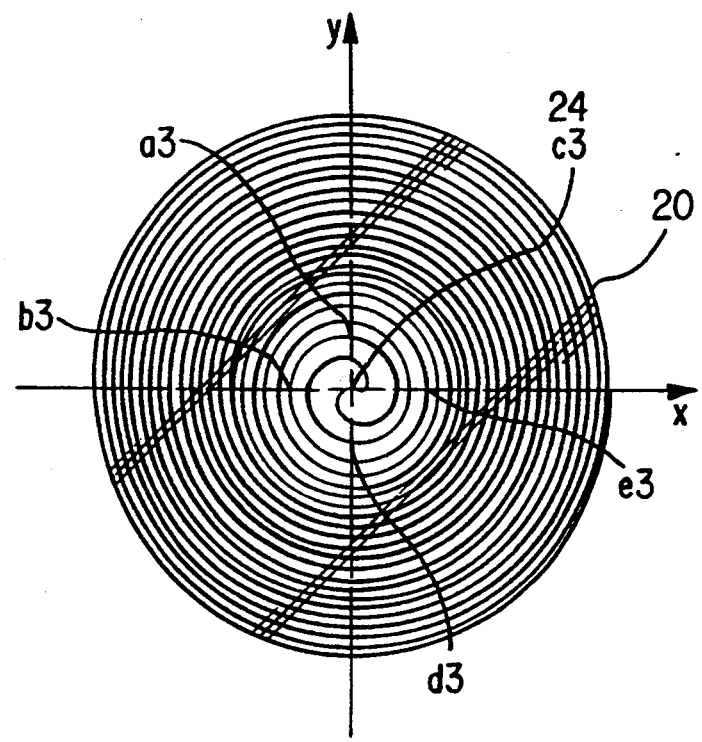
FIG. 3 is a spiral pattern capable of being used on a lens according to the present invention.

A particular spiral band pattern 20 based upon the above equations is illustrated in FIG. 3, wherein P=1.5 diopters, $\lambda$=555 nm, k=−1 and $\beta$=0. In order to facilitate the illustration, coordinates are given in Table 1 for four locations a3, b3, d3 and e3 in FIG. 3. c3 indicates the second end 24 of the pattern. This lens creates three foci with the add power being 1.5 diopters.

TABLE 1

| Location | x coordinate | y coordinate | Meridian | Radial Distance From Center (mm) |
|---|---|---|---|---|
| a3 | 0.00000 | 1.36015 | 90° | 1.36015 |
| b3 | −1.48997 | 0.00000 | 180° | 1.48997 |
| d3 | 0.00000 | −1.60935 | 270° | 1.60935 |
| e3 | 1.72047 | 0.00000 | 360° | 1.72047 |

A variation of the design shown in FIG. 3 is possible in which an optical path difference is created between the T=1 area and the T=0 area, and the light transmission in the T=0 area is returned to 100%. The optical path difference (OPD) is as follows:

$$OPD = (0.5 + m) \cdot \lambda$$

wherein m is any integer number.

Figure 4:
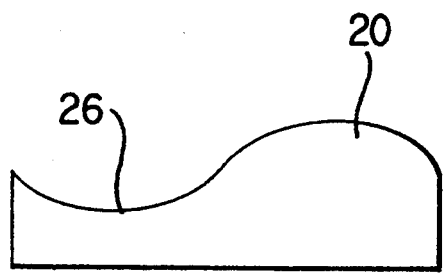
FIG. 4 is a cross-sectional view of a band segment shown in FIG. 3 taken across line 4—4 which may be used on the lens according to the present invention.

The creation of the optical path difference (OPD) can be realized by a number of ways. For example, one can design a lens having a given power by choosing a band 20 having a diffraction grating capable of selectively alternating the angle of impact of light rays on the eye. That is, the band 20 may have a cross-sectional profile which imposes on the incident wave of light a predetermined periodic variation of amplitude or phase or both. This may be done by using a band 20 having a cross-sectional profile in the form of an undulating curve, shown in FIG. 4, or having refractive index change within the band 20. This concept is discussed in detail in Born, M. and Wolf, E., Principles of Optics, pp. 401-423 1st Edition (Pergamon Press 1959), as well as U.S. Pat. No. 4,898,461 to Portney and U.S. Pat. No. 4,898,461 to Cohen, all incorporated herein by reference.

Figure 5:
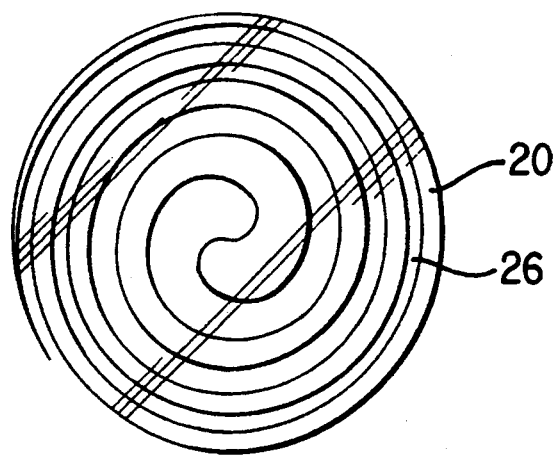
FIG. 5 is a front view of an ophthalmic lens according to the present invention in which the spiral pattern is comprised of ink.

It is also possible to manipulate optical path difference by modifying the spectrum transmission of light within the visible range (about 400 nm to 700 nm). In such instance, the T=1 area set forth above may only pass a first of spectrum light (for example, the Red-Yellow range) while the T=0 area may pass a second, different spectrum light (for example, the Green-Blue range). In practice, as shown in FIG. 5, the spiral band 20 may be printed onto the surface of the lens using an ink, preferably one having a Blue-Green shade. The space 26 between the band 20 is preferably left clear.

Figure 6:
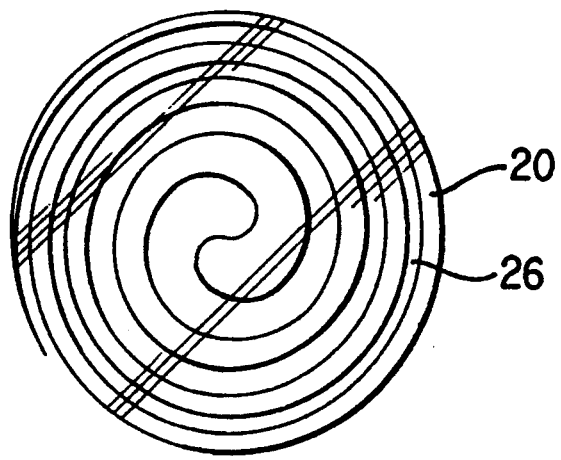
FIG. 6 is a front view of an ophthalmic lens according to the present invention in which the spiral pattern is created by selective polorization of the lens material.

As shown in FIG. 6, another possibility of manipulating optical path difference is to selectively modify the polarization of the lens material. In such instance, the T=1 area set forth above may polarize the light going through it into one orientation while the T=0 area may polarize the light going through it into another orientation (preferably being perpendicular to the polarization orientation of the T=1 area). For example, T=1 area 26 may be polarized at 180° and T=0 is polarized at 90°.

Although this invention has been described with specific reference to the preferred embodiments, it is contemplated that modifications and variations of the procedures set forth will occur to those skilled in the art familiar with the principles herein stated, and that such may be made without departing from the scope of this invention.

What is claimed is:

1. A multifocal ophthalmic lens having a spiral-like pattern on its surface in an area overlying the cornea of a wearer of the lens, said spiral-like pattern capable of providing a plurality of different dioptric powers, wherein said spiral-like pattern follows the equation:

$$T(x,y) = STEP(S)$$

wherein STEP(S) is a step function defined as 1 when $S \geq 0$ and 0 when $S < 0$; and wherein T=1 indicates light transmission is 100% and T=0 indicates light transmission is 0%; and wherein S is calculated by the equation:

$$S(x,y) = \sin[\pi \cdot P/2\lambda \cdot (x^2+y^2) + k \cdot A \tan(x/y) + \beta]$$

wherein P is the power difference between two extreme foci, $\lambda$ is the wavelength of interest, k is a spiral shape control parameter, x and y are the Cartesian coordinates of the lens with the origin located at the center of the lens and is $\beta$ the starting phase control parameter.

2. The multifocal ophthalmic lens of claim 1, wherein the spiral-like pattern is of a comprised band forming a diffraction grating capable of alternating the angle of impact of light rays.

3. The multifocal lens of claim 2, wherein the band has a cross-sectional profile in the form of an undulating curve.

4. The multifocal ophthalmic lens of claim 2, wherein the band is capable of modifying the spectrum transmission of light within the visible range.

5. The multifocal lens of claim 4, wherein the band is comprised of ink provided onto a surface of the lens, said ink being capable of modifying the spectrum transmission of light within the visible range.

6. The multifocal lens of claim 4, wherein the band is comprised of ink provided onto a surface of the lens and the spaces between the band is clear.

7. The multifocal lens of claim 4, wherein the band is comprised of a first ink capable of transmitting a first range of spectrum light and the space between the band is a second ink capable of transmitting a second range of spectrum light different from the first range of spectrum light.

8. The multifocal lens of claim 5, wherein the ink transmits light in the Red-Yellow range.

9. The multifocal lens of claim 7, wherein the first ink transmits light in the Red-Yellow range.

10. The multifocal lens of claim 9, wherein the second ink transmits light in the Green-Blue range.

11. The multifocal lens of claim 4, wherein the band is comprised of selectively polarized areas of lens material.

12. The multifocal lens of claim 4, wherein the band is comprised of selective areas of lens material having different refractive indicies.

13. The multifocal lens of claim 1, wherein the lens is adapted to be located on the surface of the eye.

14. The multifocal lens of claim 1, wherein the lens is adapted to be permanently retained within the eye.

* * * * *